(12) United States Patent
Fontaine

(10) Patent No.: US 10,478,928 B1
(45) Date of Patent: Nov. 19, 2019

(54) METHOD OF INSTALLATION AND MANUFACTURING OF A STACK PIPE HEAT EXCHANGER WITH INTEGRAL CONNECTORS

(71) Applicant: ECOINNOVATION TECHNOLOGIES INCORPORÉE, Saint-Louis-de-Gonzague (CA)

(72) Inventor: Marc Fontaine, Saint-Louis-de-Gonzague (CA)

(73) Assignee: ECOINNOVATION TECHNOLOGIES INCORPORÉE, Saint-Louis-de-Gonzague, QC (CA)

( * ) Notice: Subject to any disclaimer, the term of this patent is extended or adjusted under 35 U.S.C. 154(b) by 0 days.

(21) Appl. No.: 16/033,548

(22) Filed: Jul. 12, 2018

(51) Int. Cl.
| | |
|---|---|
| *B23P 15/26* | (2006.01) |
| *F16L 33/00* | (2006.01) |
| *B21D 53/02* | (2006.01) |
| *F16L 21/08* | (2006.01) |
| *F16L 13/02* | (2006.01) |

(52) U.S. Cl.
CPC ........... *B23P 15/26* (2013.01); *F16L 13/02* (2013.01); *F16L 21/08* (2013.01)

(58) Field of Classification Search
CPC ....... B21D 53/02; B23K 9/028; F16L 17/035; F16L 17/04; F16L 21/04; F16L 21/06; F16L 19/08; F16L 37/00; F16L 19/07; F16L 55/162; F16L 13/02; F16L 21/08; B21C 37/22; B23P 15/26
See application file for complete search history.

(56) References Cited

U.S. PATENT DOCUMENTS

| | | | |
|---|---|---|---|
| 3,368,832 A * | 2/1968 | Rader | F16L 19/041 285/251 |
| 4,050,703 A | 9/1977 | Tuvesson et al. | |
| 4,304,292 A * | 12/1981 | Cardone | F24D 17/001 165/47 |
| 4,619,311 A | 10/1986 | Vasile et al. | |
| 5,024,419 A | 6/1991 | Mulvey | |

(Continued)

FOREIGN PATENT DOCUMENTS

DE    19813213 A1    3/1999

OTHER PUBLICATIONS http://delafleur.com/blog/?m=201012.
http://www.smartclima.com/stainless-steel-tube-coil-heat-exchanger.htm.
https://www.pexuniverse.com/sioux-chief-3-port-pex-copper-manifold-672x0399.

*Primary Examiner* — Ryan J. Walters
*Assistant Examiner* — Lawrence Averick
(74) *Attorney, Agent, or Firm* — Anglehart et al.

(57) ABSTRACT

A method of installing a drain water heat recovery exchanger for pre-heating water to be heated using a solar, electric or combustion energy hot water heater or to be sent to the cold-water line of a hot-water-consuming apparatus. It includes providing a drain water heat recovery exchanger including a copper pipe inlet fitting and a copper pipe outlet fitting and a core waste water drain tube, the fittings being fashioned to include barbs for a male plastic pipe connection; inserting the drain water heat recovery exchanger into a drain water pipe, wherein the core waste water drain tube is connected to the drain water pipe; and connecting a first one of the fittings to a cold-water supply and a second one of the fittings to an inlet of a hot water heater, a hot water tank or a cold-water line of a hot-water-consuming apparatus.

12 Claims, 11 Drawing Sheets

(56) References Cited

U.S. PATENT DOCUMENTS

| | | | |
|---|---|---|---|
| 5,722,150 A * | 3/1998 | Swanson, III | F16L 33/2078 |
| | | | 285/256 |
| D528,646 S | 9/2006 | Stout, Jr. | |
| 7,322,404 B2 | 1/2008 | Van decker et al. | |
| 9,470,351 B2 | 10/2016 | Schroeder et al. | |
| 10,151,415 B1 * | 12/2018 | Holm | E03C 1/00 |
| 2004/0051303 A1 | 3/2004 | Lorenz | |
| 2013/0020800 A1 | 1/2013 | Heraud et al. | |
| 2017/0241648 A1 * | 8/2017 | Harvey | E03C 1/044 |
| 2018/0135791 A1 * | 5/2018 | Twaroski | A01G 25/026 |

* cited by examiner

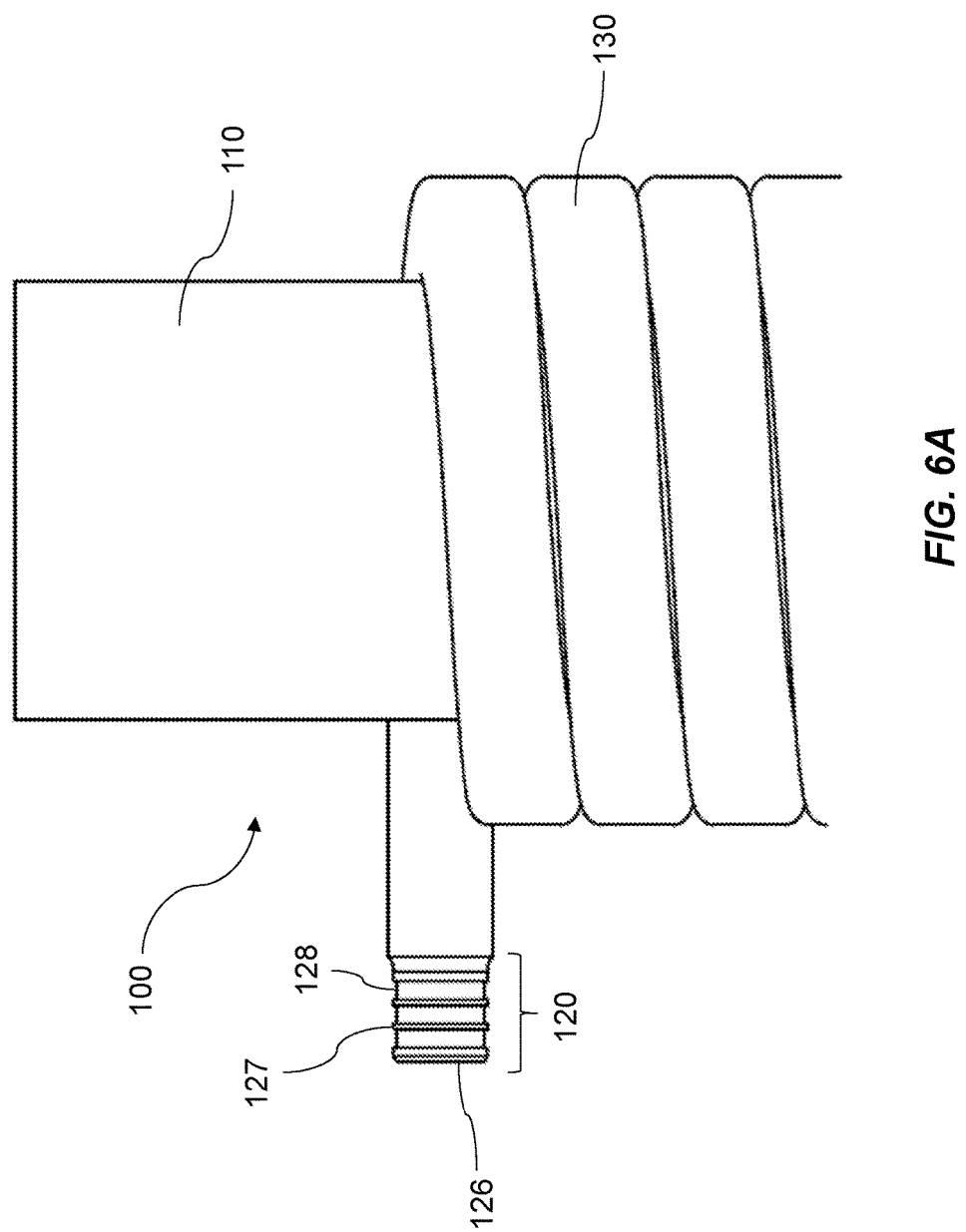

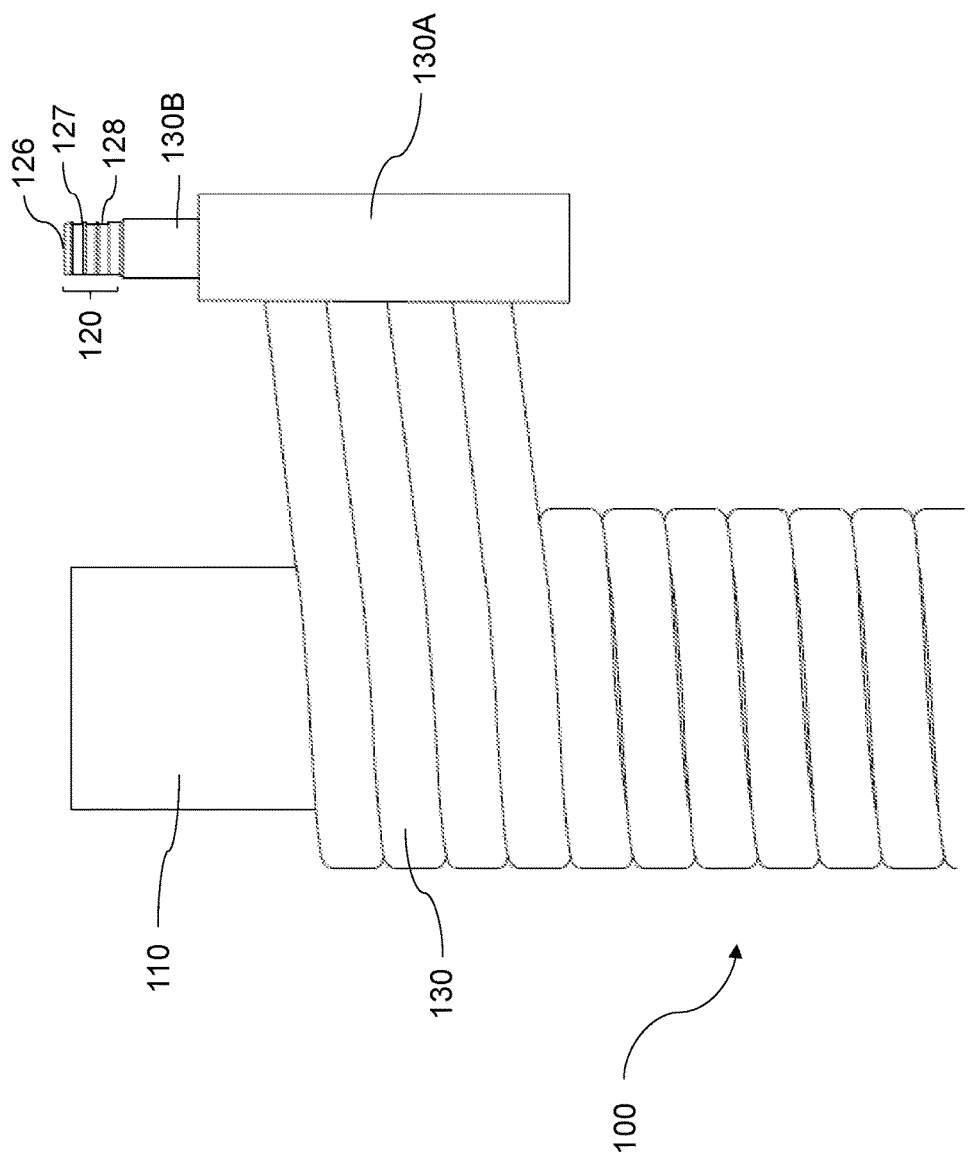

METHOD OF INSTALLATION AND MANUFACTURING OF A STACK PIPE HEAT EXCHANGER WITH INTEGRAL CONNECTORS

TECHNICAL FIELD

The present disclosure relates to heat exchangers, and more particularly to drain water heat recovery exchangers.

BACKGROUND

Drain water heat recovery exchangers, including coil drain water heat recovery exchangers, as described, for instance, in U.S. Pat. No. 7,322,404, include a central tube for receiving waste water and a pipe that is coiled around the central tube. The heat exchanger may also include other assembly components than just the coil. The tube receives warm waste water, for instance, from a shower, dishwasher or washing machine, and the coil pipe, or exchanger portion, receives cold water from a cold-water line. As the warm waste water enters the tube, the heat from the warm waste water is transferred to the tube, that is in turn transferred to the coil pipe, that then heats the cold water. As such, the cold water that exits the coil pipe is warmer than when it entered. The warmed cold water is transferred to the hot water tank, or, for instance, the cold-water line of a shower, where the work done to heat the cold water to the desired temperature is lessened due to the heat that was recovered from the warm waste water, transferred to the cold water entering the water supply system of the building.

The installation of a drain water heat recovery exchanger, as is known in the art, in a building, such as a household, proves to be a multi-step process that can be challenging and time consuming for the plumber or the installer, and costly for the building owner. Reference is now made to FIG. 1 herein, illustrating an exemplary method 10 of installing a drain water heat recovery exchanger as is known in the art.

First, a portion of the drain water pipe in the building may be cut out where the drain water heat recovery exchanger is to be installed at step 11. Then, the drain water heat recovery exchanger is connected in place of the cut out drain pipe at step 11, the tube of the drain water heat recovery exchanger aligned and fitted to the cut out drain pipe. Following this, as the ends of the coil pipe of the drain water heat recovery exchanger do not have fittings, connectors or joints (e.g. elbow joints; tee-joints) for connecting with the cold-water line pipe or the pipe leading to the cold-water line of a hot water consuming apparatus (e.g. shower) or the hot water tank, need to be added. The added fitting is compatible with the type of connecting pipe, such as a PEX (cross-linked polyethylene) pipe. Therefore, the plumber may solder on a joint at step 13 to one or both ends of the coil pipe, and is required to solder on to the ends of the coil pipe a fitting or a connector at step 14. However, the soldering of the fitting by the plumber is a dangerous process. There is a risk of fire due to the open flame involved. As a result, this step results leads to increased risk of property damage and injury. Moreover, the process of soldering is time consuming. Additionally, the purchase of a separate fitting to be soldered onto the drain water heat recovery exchanger results in additional installation cost, as the part is purchased separately.

Furthermore, after the fitting is soldered on, there is also a risk of leakage between the coil pipe and the soldered fitting. As a result, the plumber has to undertake an additional measure and verifies that the seal between the fitting and the coil pipe is watertight at step 15. Additionally, through usage of the drain water heat recovery exchanger over time, there is a risk that the connection between the fitting and the coil pipe fails, resulting in leaks. This increases the risk of water damage to the property.

After the adding of the fittings, the inlet of the coil pipe is connected to the cold-water line at step 16, and the coil pipe outlet is connected to the pipe leading to the cold-water line of a hot-water consuming apparatus (e.g. the shower, bath, faucet, etc.) or the hot water tank at step 17.

As a result, the soldering of the fitting required when installing the drain water heat recovery exchanger as is known in the art is dangerous for the building and the plumber and increases the time and cost of installation due to the requirement of having to purchase and install a separate fitting. Moreover, as the tradesman who installs the drain water heat recovery exchanger has to solder, the skillset of the tradesman is also greater, the installation more complex, the tradesman also needing to bring a greater assortment of tools onsite to complete the installation.

SUMMARY

A first solution that had been considered, during the manufacturing of the drain water heat recovery exchanger, is to solder onto the copper pipe the fitting. However, this solution does not resolve the problem of the connector being a separate part, increasing the risk of leakage during use. Additionally, this soldering process by the manufacturer results in undesirable steps performed by the manufacturer, such as fume extraction, post-cleaning of the soldered joint, and the additional cost of producing and/or purchasing the additional fitting.

It has been discovered that the above-mentioned problems faced during the installation of the drain water heat recovery exchanger can be remedied by having the end portions, or at least one end portion, of the copper pipe (carrying the cold water originating from the cold-water line) of the drain water heat recovery exchanger fashioned, during manufacturing, into the desired fitting for connecting to ends of the copper pipe to the pipes of the water supply system of the building. As such, the fitting is integral and part of the copper pipe of the drain water heat recovery exchanger. Soldering is no longer required during manufacturing and during installation to connect a fitting. The pipe fitting is continuous and formed from the copper pipe of the drain water heat recovery exchanger. As such, the copper pipe fashioned with its pipe fittings constitutes one continuous body, reducing the risk of leaks. Manufacturing and installation costs are lowered, as no separate fitting has to be purchased and connected. Additionally, the skill and time of labor during installation is lessened (e.g. less steps due to not having to solder on the fitting). Moreover, in some examples, the manufacturing operation may be machine-automated, requiring little to no manual labour.

The end portions of the copper pipe are fashioned into a fitting including a plurality of annular grooves around the copper pipe, resulting in a series of peaks and troughs. As PEX piping is often used in buildings for water supply, the fitting can be one compatible with PEX pipes, i.e. a fitting for PEX pipes.

A broad aspect is a method of installing a drain water heat recovery exchanger for pre-heating water to be heated using a solar, electric or combustion energy hot water heater or to be sent to the cold-water line of a hot-water-consuming apparatus. The method includes providing a drain water heat recovery exchanger including a copper pipe inlet fitting and a copper pipe outlet fitting and a core waste water drain tube, the fittings being fashioned to include barbs for a male plastic pipe connection. The method includes inserting the drain water heat recovery exchanger into a drain water pipe, wherein the core waste water drain tube is connected to the drain water pipe. The method includes connecting a first one of the fittings to a cold-water supply and a second one of the fittings to an inlet of a hot water heater, a hot water tank or a cold-water line of a hot-water-consuming apparatus.

In some embodiments, the connecting may include connecting plastic pipe to the fittings using a clamp ring.

In some embodiments, the connecting may include cutting the copper pipe inlet and outlet fittings to remove a portion including the barbs, soldering a copper pipe fitting and connecting copper pipes to the fittings.

In some embodiments, the connecting may include making a bend in a length of plastic pipe between the outlet fitting and a fitting at the inlet of the hot water heater, the hot water tank or the cold-water line of the hot-water-consuming apparatus.

In some embodiments, the bend may have a radius between 6 to 8 times a diameter of the plastic pipe.

In some embodiments, the connecting may include making a bend in a length of plastic pipe between the inlet fitting and a fitting connected to the cold-water supply.

In some embodiments, the bend may have a radius between 6 to 8 times a diameter of the plastic pipe.

In some embodiments, the provided drain water heat recovery exchanger may include a copper pipe that is spirally wrapped around the core waste water drain tube, and the copper pipe inlet fitting is fashioned from a first end portion of the copper pipe, and the copper pipe outlet fitting is fashioned from a second end portion of the copper pipe.

In some embodiments, the copper pipe inlet fitting may have a diameter that is less or greater than a diameter of the copper pipe, and the copper pipe outlet fitting may have a diameter that is less or greater than a diameter of the copper pipe.

Another broad aspect is a method of forming a pipe fitting from an end of a copper pipe of a drain water heat recovery exchanger, the drain water heat recovery exchanger comprising a core tube with a first width and the copper pipe with a second width, the second width inferior to the first width. The method includes, receiving an end portion of the copper pipe. The method includes one of reducing and increasing the diameter of the end portion by forming the end portion. The method includes forming a plurality of circumferential grooves and barbs at the end portion of the copper coil pipe to produce the pipe fitting at the end portion of the copper coil pipe.

In some embodiments, the copper pipe of the provided drain water heat recovery exchanger may be coiled.

In some embodiments, the forming a plurality of circumferential grooves and barbs at the end portion may be performed by at least one of rotary-forming, roll-forming, crimping and die-pressing the copper material of the reduced end portion of the copper pipe.

In some embodiments, the forming a plurality of circumferential grooves and barbs at the end portion may be performed by roll-forming the reduced end portion of the copper pipe.

In some embodiments, the method may further include machining the formed end portion to reduce the length of the pipe fitting and/or to further shape the dimensions of the pipe fitting.

In some embodiments, three circumferential grooves may be formed at the end portion.

In some embodiments, the pipe fitting may have a diameter between ⅜ of an inch and one inch.

In some embodiments, the formed pipe fitting may be adapted to connect with a cross-linked polyethylene (PEX) pipe.

In some embodiments, the method may include detecting the position and orientation of the end portion of the copper pipe to align the end portion prior to the reducing and the forming.

Another broad aspect is a method of installing a drain water heat recovery exchanger to a water supply system of a building for recovering heat from waste water for heating cold water coming from a cold-water line of the water supply system. The method includes providing a drain water heat recovery exchanger including a core waste water drain tube; a first copper pipe portion comprising an inlet pipe fitting fashioned from the first copper pipe portion to include a series of grooves and barbs and a diameter than is different from the diameter of the rest of the first copper pipe portion; and a second copper pipe portion comprising an outlet pipe fitting fashioned from the second copper pipe portion to include a series of grooves and barbs and a diameter than is different from the diameter of the rest of the first copper pipe portion. The method includes inserting the drain water heat recovery exchanger into a drain water pipe, wherein the core tube is connected to the drain water pipe. The method includes connecting a pipe of a cold-water line to the inlet pipe fitting. The method includes connecting a pipe of at least one of a hot-water tank and a cold-water line of a hot-water consuming-apparatus to the outlet pipe fitting.

In some embodiments, the first copper pipe portion and the second copper pipe portion may be part of a copper coil pipe of the provided drain water heat recovery exchanger that spirally wraps around the core tube.

In some embodiments, the inlet pipe fitting of the provided drain water heat recovery exchanger may include three interspaced grooves, and wherein the outlet pipe fitting of the provided drain water heat recovery exchanger may include three interspaced grooves.

In some embodiments, the method may include removing a portion of the drain water pipe prior to connecting the tube to the drain water pipe.

In some embodiments, the fastened pipe of the cold-water line may be composed of cross-linked polyethylene (PEX), and wherein the fastened pipe directing water to the at least one a hot-water tank and a cold-water line of a hot-water consuming apparatus may be composed of cross-linked polyethylene (PEX).

In some embodiments, at least one of said inlet pipe fitting of said provided drain water heat recovery exchanger and said outlet pipe fitting of said provided drain water heat recovery exchanger may have a diameter between ⅜ of an inch and 1 inch.

BRIEF DESCRIPTION OF THE DRAWINGS

The invention will be better understood by way of the following detailed description of embodiments of the invention with reference to the appended drawings, in which:

FIG. 6A is a drawing of a blown-up side view of the top of an exemplary drain water heat recovery exchanger showing an exemplary pipe fitting;

FIG. 6C is a drawing of a blown-up side view of the top of an exemplary drain water heat recovery exchanger showing an exemplary pipe fitting at an end of a copper pipe extension of a copper pipe;

DETAILED DESCRIPTION

Figure 1:
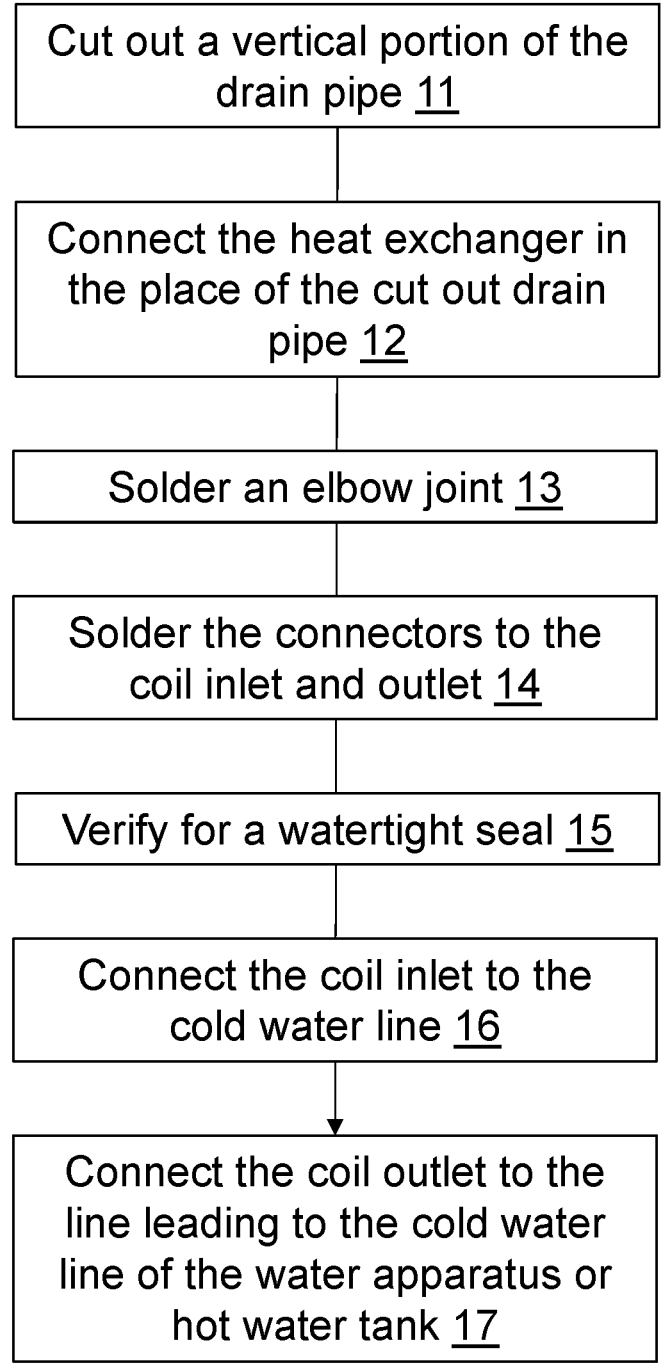
FIG. 1 is a flowchart diagram of an exemplary method, in accordance with the prior art, of installing an exemplary prior art drain water heat recovery exchanger to the water supply system of a building.

The present disclosure relates to an improved drain water heat recovery exchanger, where one or both end portions of the copper pipe that receives and discharges cold water to be used by the water supply system of a building is fashioned into a pipe fitting. The fashioned pipe fitting is part of the copper pipe. The fashioned male pipe fitting has a diameter that is greater or lesser than the diameter of the copper pipe, and includes a plurality of annular grooves and annular barbs. The barbs grip onto and fasten onto a pipe, the pipe positioned over the male pipe fitting, creating a female-male fitting. As such, as the pipe fittings are fashioned from the copper pipe, there is no need to solder onto the ends of the copper pipe of the drain water heat recovery exchanger any separate fitting. This reduces the risk of fire, lowers the installation cost (e.g. no extra part has to be purchased) and reduces installation time (e.g. no more soldering time).

Definitions:

By "hot-water-consuming apparatus", it is meant an apparatus found in a building that utilizes hot water. Such apparatuses may be, but are not limited to, a shower, a bath, a tap for a sink, a dish-washer, a washing machine, an appliance requiring warm water to perform its function, etc.

By "drain water heat recovery exchanger", it is meant a heat exchanger that is installed and connected to a drain water pipe. The drain water heat recovery exchanger receives waste water flowing from the drain water pipe. When the waste water is at least warm, the heat from the waste water is transferred to cold water entering a separate isolated portion, chamber or pipe of the drain water heat recovery exchanger. As such, the entering cold water is warmed. The warmed cold water leaves the drain water heat recovery exchanger. As such, the warmed cold water reduces the energy required by the hot-water consuming apparatus or the water heater to heat the water, therefore saving energy. In the present embodiment, drain water heat recovery exchangers includes, but are not limited to, embodiments where the cold-water line enters a chamber or pipe defined as one or more copper pipes spirally wrapped around the central chamber that receives the warm drain water. The drain water heat recovery exchanger has a first copper pipe portion with a first end for receiving water from a cold-water inlet, and a second copper pipe portion with a second end for discharging the cold-water that has been received at the first end. The first copper pipe portion and the second copper pipe portion may be part of the same copper pipe body, such as when one or more copper pipes (with or without copper pipe extensions) are coiled around a core waste water drain tube of the drain water heat recovery exchangers.

By "water supply system" of a building, it is meant the architecture that is used to provide water to the building and to the water consuming or retaining components of the building, including to the different hot-water-consuming apparatuses, water tanks (e.g. hot water tanks), etc. The water supply system includes the plumbing of the building for directing water throughout the building (including for bringing water to and for evacuating water from the building).

Figure 2:
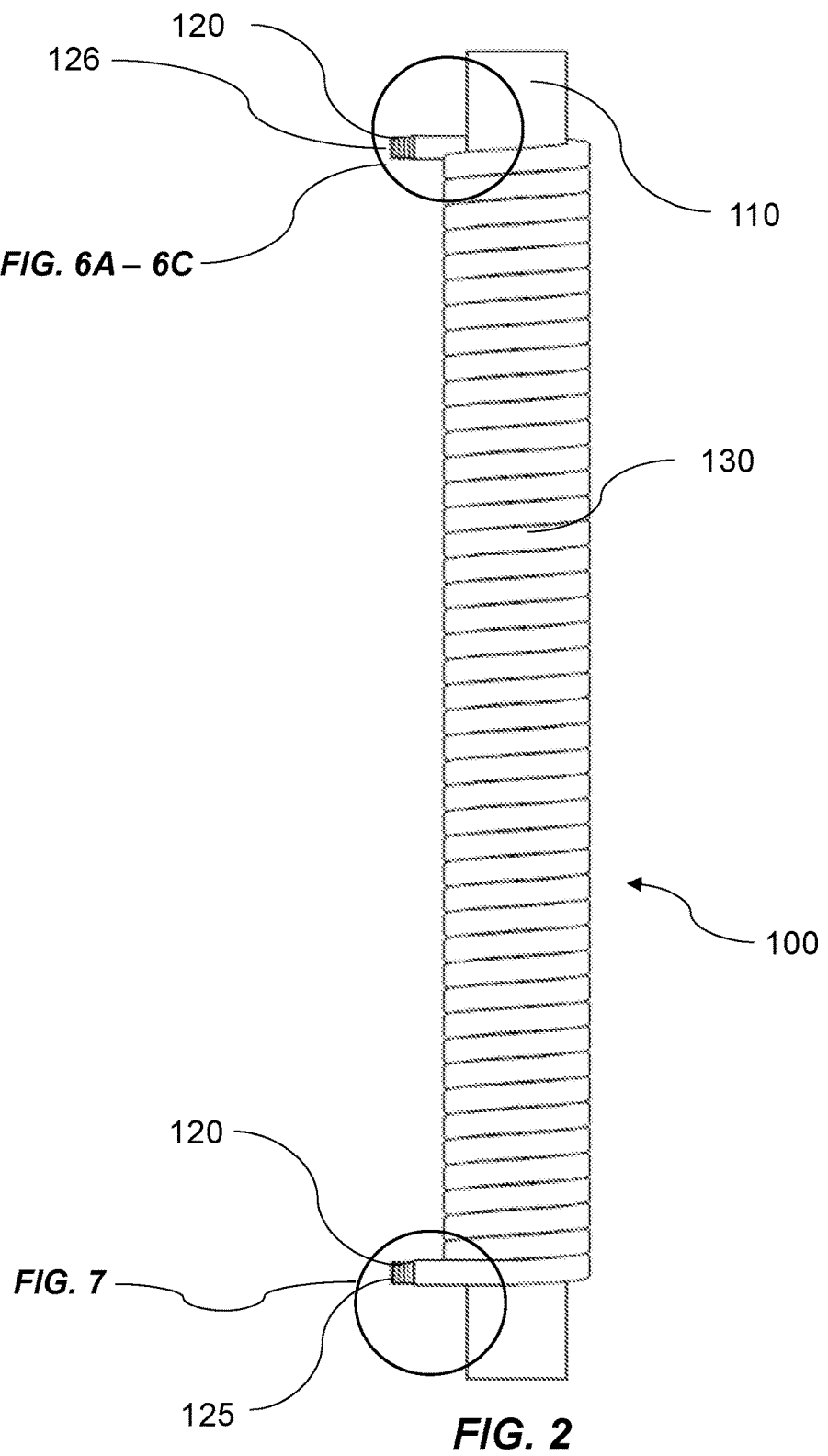
FIG. 2 is a drawing of a side view of an exemplary drain water heat recovery exchanger where the end portions of the copper pipe are formed into exemplary pipe fittings.
Figure 3:
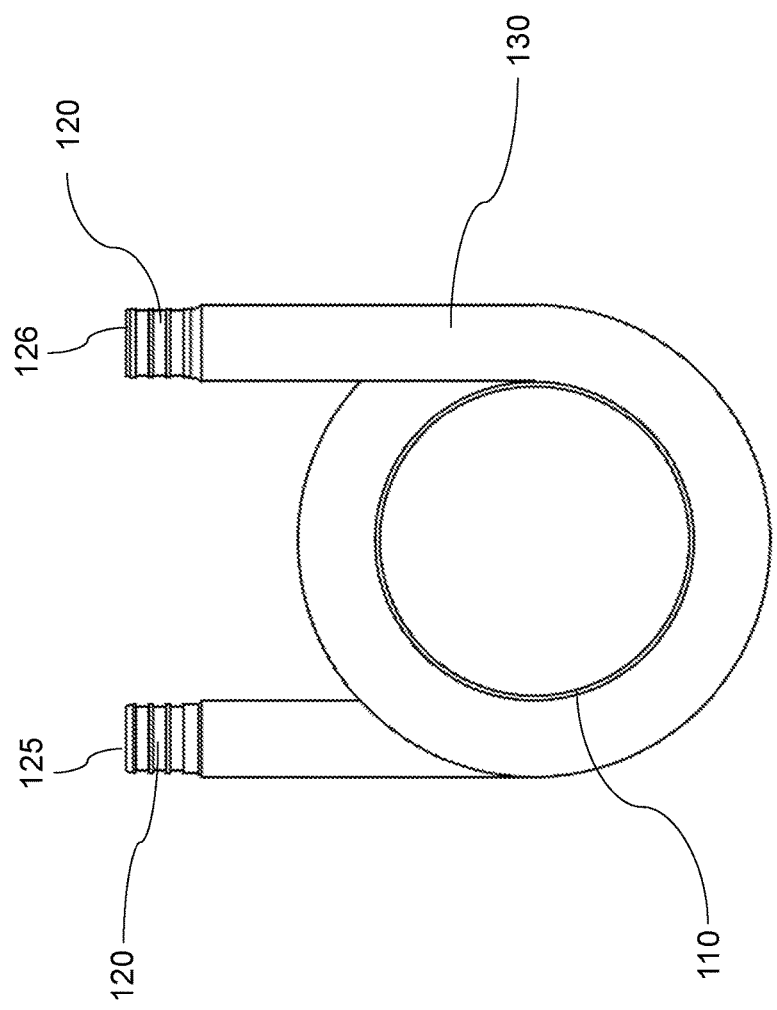
FIG. 3 is a drawing of a top-down view of an exemplary drain water heat recovery exchanger where the end portions of the copper pipe are formed into exemplary pipe fittings.

The Drain Water Heat Recovery Exchanger:

Reference is now made to FIGS. 2 and 3, illustrating an exemplary drain water heat recovery exchanger 100 in accordance with the present teachings. Even though heat exchanger 100 is illustrated for exemplary purposes as having a pipe coiled around the central tube 100, it will be understood that other drain water heat recovery exchangers 100 may be used in accordance with the present teachings. For instance, the drain water heat recovery exchanger may have an outer chamber formed by a jacket with spiral fins placed along the inner wall of the jacket, where the cold water flows up the space defined between the tube and the jacket. The drain water heat recovery exchanger has an inlet pipe extending out of the base, and an outlet pipe extending out from the top of the drain water heat recovery exchanger. These inlet and outlet pipes may be fashioned into pipe fittings as described herein, the installation of the drain water heat recovery exchanger carried out in accordance with the present teachings.

The drain water heat recovery exchanger 100 has a central tube 110 and a copper pipe 130 coiled around the central tube 110.

The copper pipe 130 has end portions 120. One end portion 120 leads to the inlet 125 of the copper pipe 130 through which clean cold water enters the copper pipe 130. The other end portion 120 leads to the outlet 126 of the copper pipe 130 through which the warmed cold water is discharged.

One or both of the end portions 120 are fashioned into pipe fittings as explained herein (the pipe fittings, being the end portions, are also referred to herein by numeral 120).

The central tube 110 has a diameter sufficient to let warm waste water flow within, along the inner wall of the central tube 110. The diameter of the central tube 110 may be similar to or match the diameter of the drain water pipe that carries the waste water. In some examples, the diameter of the central tube may be between 1.5 inches to 12 inches. In some embodiments, the central tube 110 may be made out of copper, stainless steel, cast iron or plastic.

The copper pipe 130 may spirally wrap around the central tube 110. In some examples, there may be more than one copper pipe 130 (e.g. spirally wrapped around the core tube 110). The coils of the copper pipe 130 may be touching. The copper pipe 130 makes contact with the exterior wall of the central tube 110, allowing for heat to transfer from the central tube 110 to the copper pipe 130, and then to the cold water that is flowing through the copper pipe 130.

The pipe fittings 120 are fashioned from the end portions of the copper pipe 130 such that their diameter is inferior to the diameter of the copper pipe 130. The pipe fittings 120 are further fashioned to have a plurality of barbs and grooves forming the connector. The barbs are annular, and the grooves are annular. For instance, when the pipe for connecting to the pipe fitting 120 is a PEX pipe, the pipe fitting 120 may have three grooves as shown in FIGS. 6A-6C and 7, the grooves located between the barbs (and, in some cases, by the next formed between the un-fashioned copper pipe and the fashioned copper pipe). It will be understood that the number of grooves, barbs, the distance between the grooves and the barbs, the height and width of the barbs, the width of the grooves, and the overall configuration of the grooves and the barbs that make up the fitting may vary as a function of the pipe to which the pipe fitting 120 is to connect.

In one example, when the PEX pipe has a diameter of 0.875 inches, the pipe fitting may be dimensioned to have a diameter of 0.75 inches, the PEX pipe fitting over the pipe fitting 120. It will be understood that the diameter of the pipe fitting 120, as well as its length, may vary depending on the type of pipe to which it is intended to be connected. For instance, the diameter may be, for instance, ⅜ of an inch, ½ an inch, ¾ of an inch, one inch, etc.

Figure 6B:
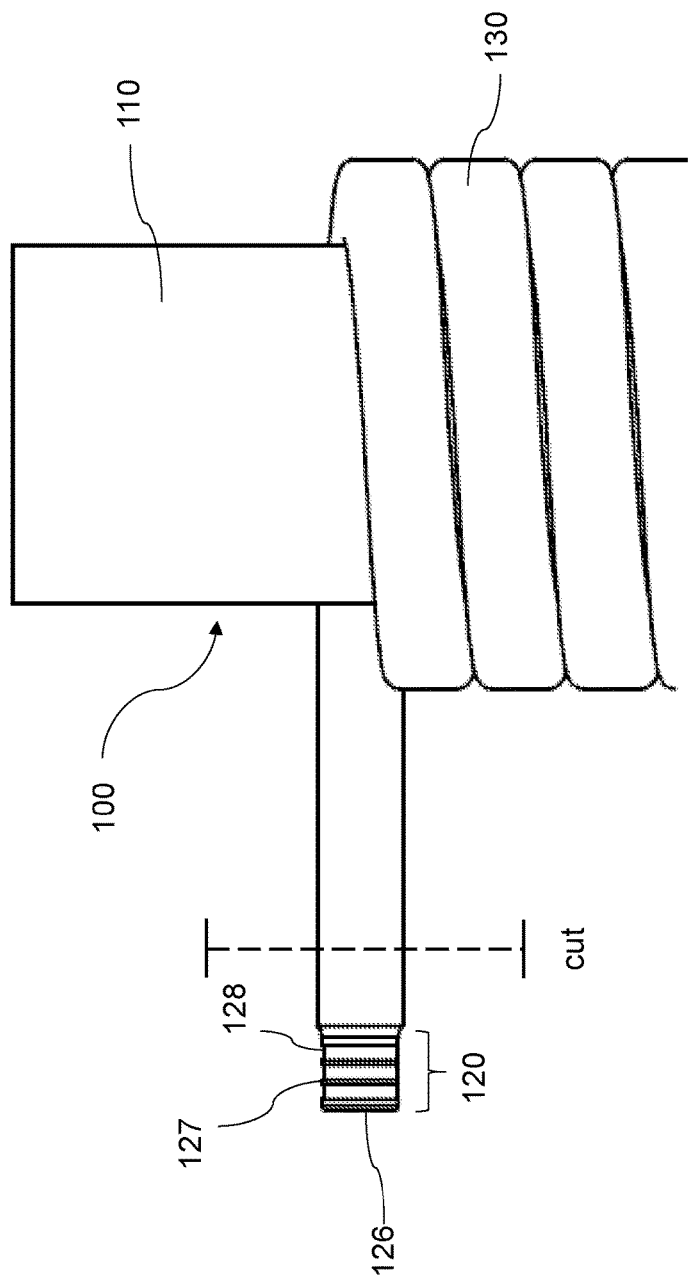
FIG. 6B is a drawing of a blown-up side view of the top of an exemplary drain water heat recovery exchanger showing an exemplary pipe fitting.

As shown in FIGS. 6A-6C (even if these figures are shown, for exemplary purposes, with respect to the pipe fitting 120 of the outlet 126, the differences in configuration shown therein may equally apply to the pipe fitting of the inlet 125), the length of copper pipe 130 extending away from the central tube 110 may vary. As shown in FIG. 6B, in some examples, the length of the copper pipe 130 extending away from the central tube 110 may be sufficient such that the pipe fitting 120 may be cut off. This may allow the end of the copper pipe 130 to be directly connected to, e.g., a joint (e.g. elbow joint; tee-joint) through, e.g., soldering. This exemplary embodiment may be useful, for example, in buildings or household where-copper piping is preferred or required (copper pipe not being as flexible as PEX piping).

FIGS. 6A-6C also illustrate how the pipe fitting 120 is fashioned directly from the copper pipe 130. The pipe fitting 120 has a narrower diameter than that of the copper pipe 130. The pipe fitting 120 is also fashioned such that barbs 127 are interspersed between grooves 128, and the end member leading to the outlet 126. The grooves 128 are interspersed between the barbs 127. The groove 128 closest to the central tube 110 is formed between one barb 127 and the un-fashioned portion of the copper pipe 130.

With reference to FIG. 6C, it will be understood that in some examples of drain water heat recovery exchangers, the copper pipe 130 may have one or more additional extensions (e.g. extensions 130A and 130B). Therefore, a fitting fashioned from a copper pipe may include a pipe fitting fashioned from a copper pipe extension of the copper pipe. For the purposes of the present disclosure, the copper pipe 130 may be defined, in certain examples, as including these extensions, e.g., 130A and 130B. In these examples, such as the example of FIG. 6C, the pipe fitting 120 may be added to the copper pipe 130, at the position of its copper pipe extension 130B, next to the outlet 126 positioned at the end of the extension 130B of the copper pipe 130. More than one copper pipe can lead to a single copper pipe extension 130A, the pipe fitting found at the end of the copper pipe extension 130B joined to copper pipe extension 130A. In the present disclosure, by pipe fitting fashioned to a copper pipe, it may include a pipe fitting that is fashioned at an end of a copper pipe extension, where one or more than one copper pipes (e.g. coiled copper pipe) are joined together by a copper pipe extension, as shown in FIG. 6C.

Figure 7:
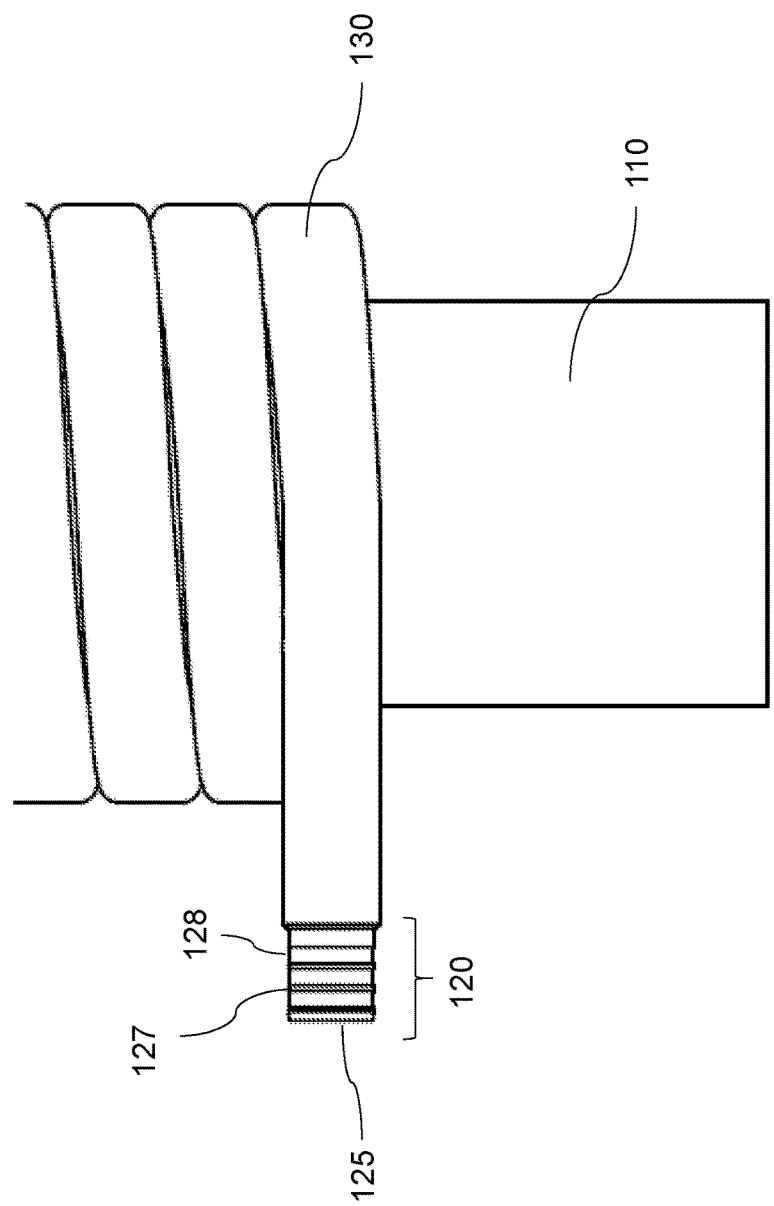
FIG. 7 is a drawing of a blown-up side view of the bottom of an exemplary drain water heat recovery exchanger showing an exemplary pipe fitting.

FIG. 7 shows the pipe fitting 120 positioned next to the inlet 125.

Once the drain water heat recovery exchanger 100 is connected to the drain water pipe, the drain water heat recovery exchanger 100 has an inlet 125 located at its base, a pipe fitting 120 located next to its inlet 125, and an outlet 126 located at its top, a pipe fitting 120 located next to its outlet.

Therefore, once installed, waste water originating from a hot-water-consuming apparatus flows down the central tube 110. Heat from the waste water is transferred to the central tube 110 as the water flows down the inner wall of the central tube 110. As the central tube 110 is in contact with the copper pipe 130, the heat of the central tube 110 is transferred to the copper pipe 130, heating in turn.

Once the drain water heat recovery exchanger 100 installed, the inlet 125 may be connected to a cold-water line. The outlet 126 may be connected to a hot water tank, a water heater, or to a cold-water line of a hot-water-consuming apparatus.

Cold water from a cold-water line enters the inlet 125, spiralling up the copper pipe 130. As the cold water is channeled through the copper pipe 130, the cold water is in contact with the inner wall of the warmed copper pipe 130. The cold water is warmed as a result. When the clean cold water leaves the copper pipe 130, it may be warmer than when it first entered. As such, the heat of the waste water is recovered, transferred to the cold water, reducing the energy that is dedicated to heating the clean cold water.

Figure 5:
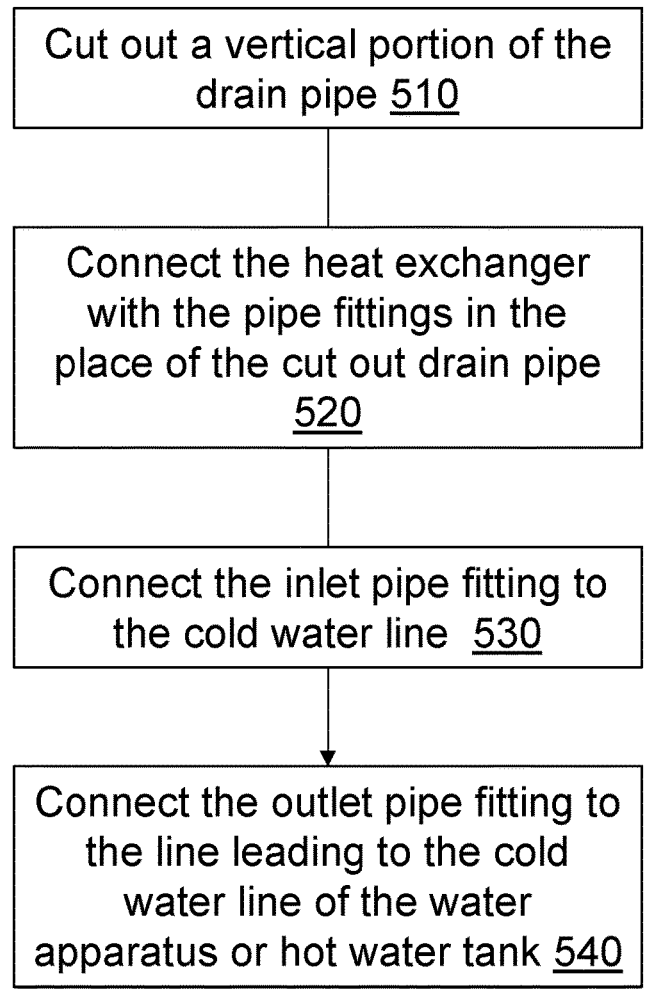
FIG. 5 is a flowchart diagram of an exemplary process of installing an exemplary drain water heat recovery exchanger with the end portions of its copper pipe fashioned into pipe fitting.
Figure 5:
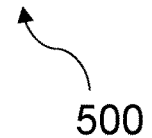

Method of Installing an Exemplary Drain Water Heat Recovery Exchanger:

Reference is now made to FIG. 5, illustrating an exemplary method 500 of installing a drain water heat recovery exchanger (e.g. drain water heat recovery exchanger 100) in accordance with the present teachings. For purposes of illustration, reference will be made when describing method 500 to drain water heat recovery exchanger 100. However, it will be understood that method 500 may be performed with respect to another drain water heat recovery exchanger 100 without departing from the present teachings.

Optionally, a portion of the drain pipe may be cut out at step 510. This may be performed when the building has already been constructed, and the drain water heat recovery exchanger 100 is added post-construction. When, e.g., the building is currently under construction, there may be no need to cut out the drain water pipe, as the drain water heat recovery exchanger 100 may be integrated simply during the construction of the building to the drain water pipe.

In some examples, the central tube 110 of the drain water heat recovery exchanger 100 may be then connected to the cut out drain pipe at step 520, creating a watertight seal.

As the end portion of the copper pipe 130 next to the inlet 125 is already fashioned into a pipe fitting 120, the pipe of the cold-water line can be directly connected to the pipe fitting 120 without there having to be any soldering at step 530. As such, the connection can be achieved without there being a risk of fire (as the connector does not have to be soldered onto the end of the copper pipe 130). The pipe fitting 120 and the pipe create a male-female connection. Furthermore, if the pipe of the cold-water line is made out of plastic (e.g. PEX), due to its flexibility, it can be shaped and bent depending on the direction and path needed to be taken by the pipe. In fact, the plastic pipe can be bent such that the bend has a radius between 6 to 8 times the diameter of the plastic pipe.

An appropriate clamp, such as a crimp ring, can be fastened over the pipe fitting 120 of the inlet 125 and the pipe placed thereover, securing the pipe to the pipe fitting 120.

In some examples, when the pipe fitting 120 is not appropriate for the installation, the length of the portion of the copper pipe 130 at the inlet 125 extending away from the central tube 110 may be sufficient such that the pipe fitting 120 may be cut off, leaving a portion extending, e.g., horizontally away from the central tube 110. This may be necessary when a plastic pipe is not appropriate, and a non-flexible pipe (e.g. such as copper) is to be connected to the inlet 125 of the copper pipe 130. A joint (e.g. tee-joint; elbow joint) may be attached (e.g. soldered) to the portion of the copper pipe 130 once the pipe fitting 120 has been cut off, for connecting the copper pipe 130 to the pipe of the water supply system of the building.

As the end portion of the copper pipe 130 next to the outlet 126 is already fashioned into a pipe fitting 120, the pipe of the cold-water line can be directly connected to the pipe fitting 120 without there having to be any soldering at step 540. As such, the connection can be achieved without there being a risk of fire (as the connector does not have to be soldered onto the end of the copper pipe 130). The pipe fitting 120 and the pipe create a male-female connection. Furthermore, if the pipe of the cold-water line is made out of plastic (e.g. PEX), due to its flexibility, it can be shaped and bent depending on the direction and path needed to be taken by the pipe. In fact, the plastic pipe can be bent such that the bend has a radius between 6 to 8 times the diameter of the plastic pipe.

An appropriate clamp, such as crimp ring, can be fastened over the pipe fitting 120 of the outlet 126 and the pipe placed thereover, securing the pipe to the pipe fitting 120.

In some examples, when the pipe fitting 120 is not appropriate for the installation, the length of the portion of the copper pipe 130 at the outlet 126 extending away from the central tube 110 may be sufficient such that the pipe fitting 120 may be cut off, leaving a portion extending, e.g., horizontally away from the central tube 110. This may be necessary when a plastic pipe is not appropriate, and a non-flexible pipe (e.g. such as copper) is to be connected to the outlet 126 of the copper pipe 130. A joint (e.g. tee-joint; elbow joint) may be attached (e.g. soldered) to the portion of the copper pipe 130 once the pipe fitting 120 has been cut off, for connecting the copper pipe 130 to the pipe of the water supply system of the building.

Figure 8:
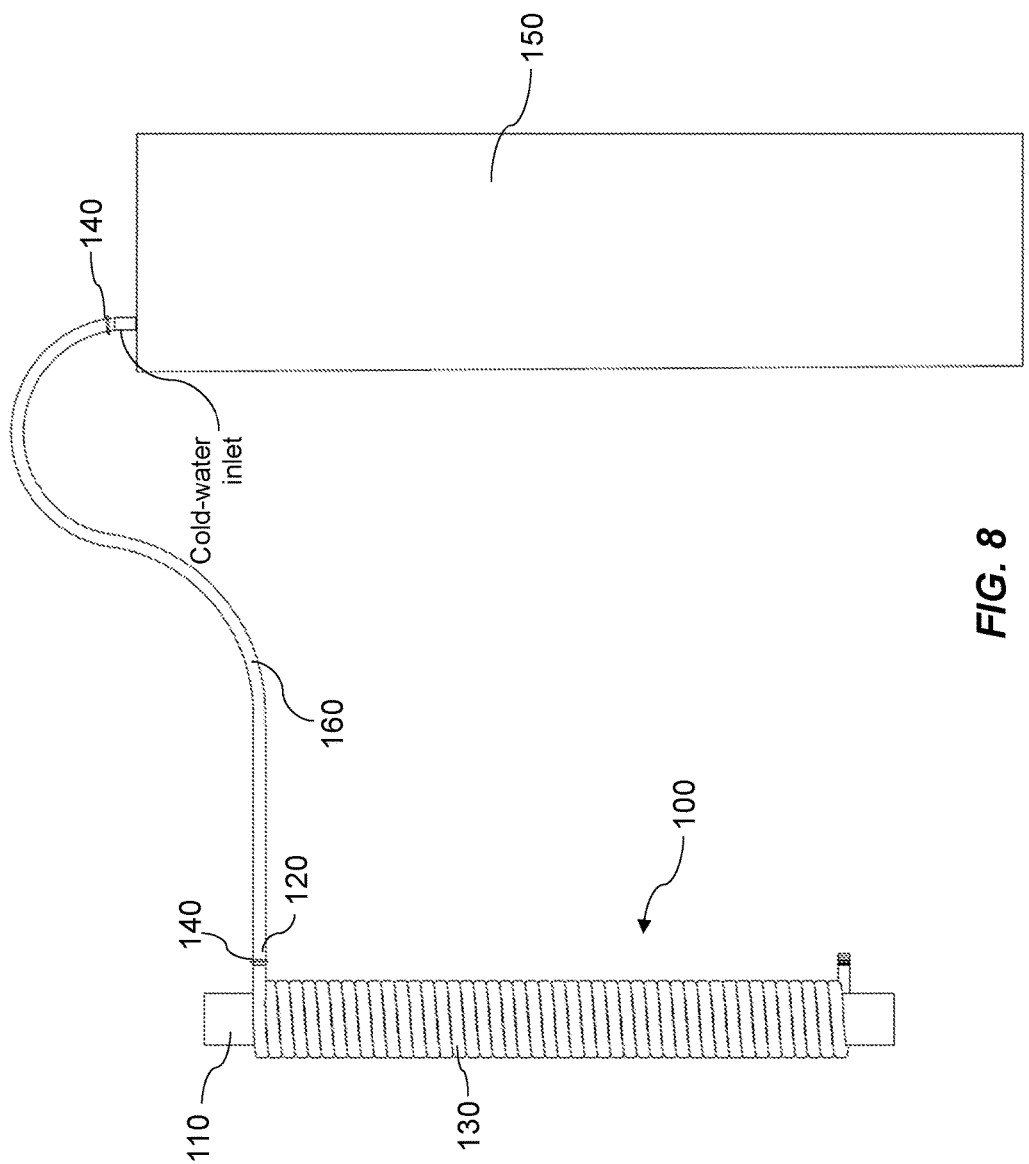
FIG. 8 is a drawing of an exemplary drain water heat recovery exchanger installed to the cold-water inlet of a hot water tank with a flexible plastic pipe, where the outlet of the drain water heat recovery exchanger is at a different height than that of the cold-water inlet of the hot water tank, and the flexion of the plastic pipe permits to connect the outlet of the heat exchanger and the cold-water inlet of the hot water tank despite the difference in height.

Reference is made to FIG. 8, illustrating an exemplary drain water heat recovery exchanger 100 installed to a hot water tank.

As shown in FIG. 8, the outlet 126 of the copper pipe 130 is at a lower height than the cold-water inlet of the hot water tank 150 (it would be understood that the relative position of the outlet 126 with respect to the inlet of the hot water tank may vary, where the outlet 126 may be, in some examples, higher or at the same level as the cold-water inlet of the hot water tank). Therefore, the plastic pipe 160 (e.g. PEX pipe) can be shaped, curved or bent to make the connection between the outlet 126 of the drain water heat recovery exchanger 100 and the cold-water inlet of the hot water tank 150. The flexibility of the plastic pipe allows for it to bend into different shapes. As a result, having a pipe fitting 120 adapted to receive and secure thereon a plastic pipe 160 may be useful for installing a drain water heat recovery exchanger 100, when, e.g., the drain water heat recovery exchanger 100 is installed in a tight space, or when the difference in position between the outlet 126 and the inlet of the hot-water-consuming apparatus or the hot water tank 150 requires that the pipe 160 be flexed (not a straight path).

An appropriate clamp 140, such as a crimp ring, may be used to secure the plastic pipe 160 to the pipe fitting 120. An appropriate clamp 140 (e.g. a crimp ring) is also shown to secure the plastic pipe 160 to the cold-water inlet of the hot water tank 150.

Figure 4A:
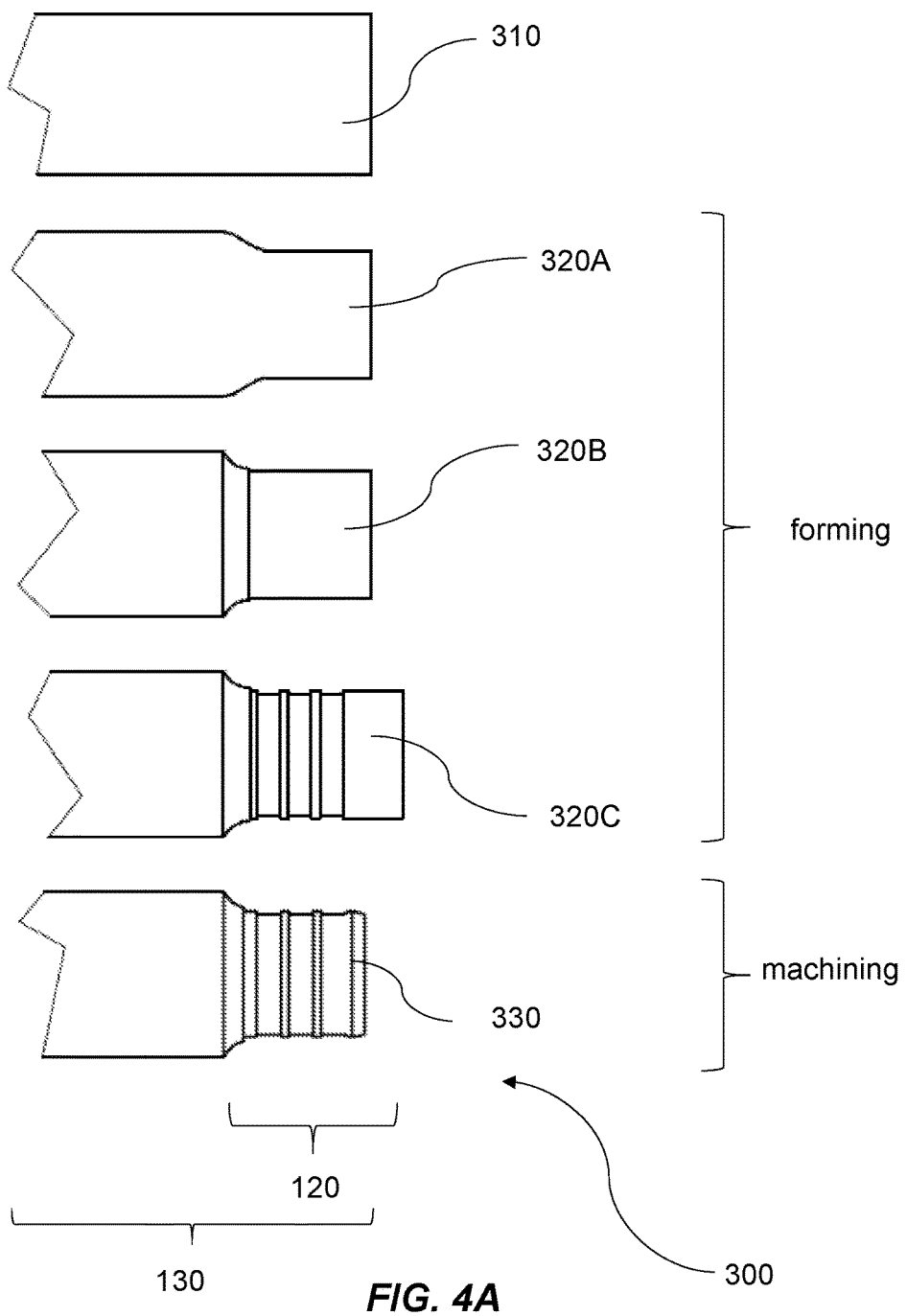
FIG. 4A is a drawing of an exemplary end portion of a copper pipe of an exemplary coiled heat exchanger as the end portion undergoes the manufacturing process to be shaped into an exemplary pipe fitting, combined with a flowchart-diagram of an exemplary process of shaping the end portion of the copper pipe into an exemplary form fitting.
Figure 4B:
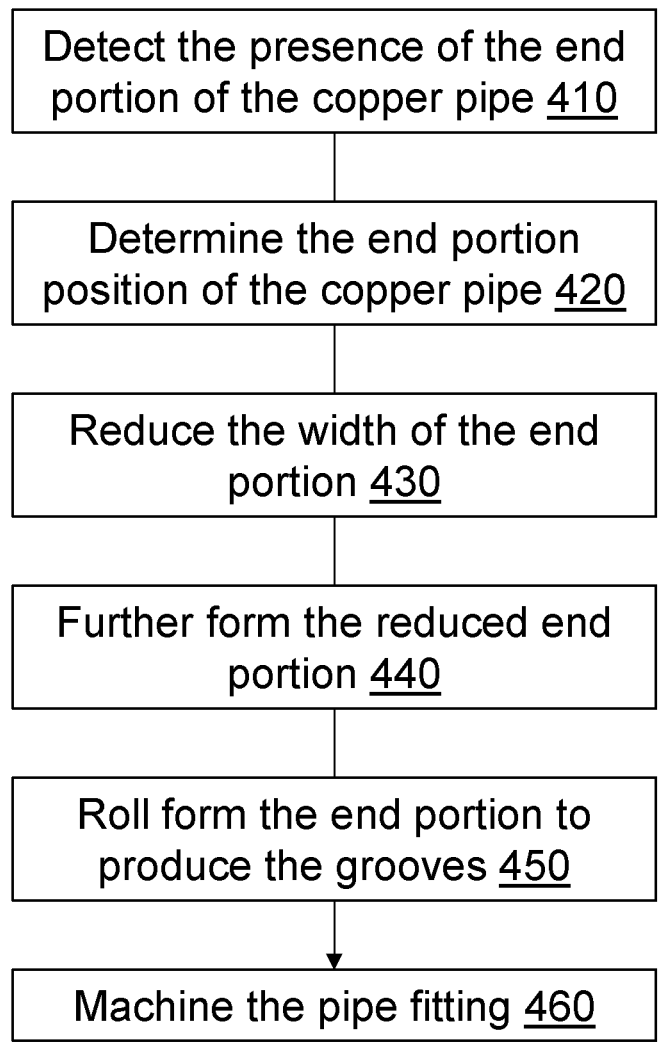
FIG. 4B is a flowchart of an exemplary method of forming pipe fitting from the end portions of a copper pipe of an exemplary coiled heat exchanger.
Figure 4B:
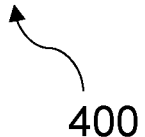

Method of Forming a Pipe Fitting at an End of a Coiled Copper Pipe of a Drain Water Heat Recovery Exchanger:

Reference is now made to FIG. 4B, illustrating an exemplary method 400 of forming or fashioning a pipe fitting from an end portion (i.e. at the inlet or outlet) of a coiled copper pipe of a drain water heat recovery exchanger. Reference will also be made to FIG. 4A, and stages 300 of the end portion 120, illustrating the transformation of an exemplary end portion of the copper pipe as it is being fashioned into an exemplary pipe fitting.

For purposes of illustration, reference will be made when describing method 400 to drain water heat recovery exchanger 100. However, it will be understood that method 400 may be performed with respect to another drain water heat recovery exchanger 100 without departing from the present teachings.

Optionally, once the drain water heat recovery exchanger 100 is positioned for forming its end portion(s), the presence of the end portion of the copper pipe 130 may be detected at step 410, and its position (or orientation) may also be detected at step 420, triggering the rest of the pipe fitting forming process. For instance, the machinery responsible for forming the end portion may include one or more proximity sensors, tactile sensors or force sensors for detecting the presence and/or position of the end portion.

The end portion is first formed to reduce its width at step 430, as shown as stage 320A in FIG. 4A. The end portion at stage 320A has a diameter that is lesser than the diameter of the copper pipe 130 of the drain water heat recovery exchanger 100.

The end portion may then be further formed to define the separation between the portion of the copper pipe 130 that is to become the pipe fitting, and the rest of the copper pipe 130 at step 440. As shown by stage 320B of FIG. 4A, a ridge is starting to be formed after the neck that constitutes the transition between the copper pipe 130 and the formed end portion.

The end portion is then further formed to produce the plurality of barbs and grooves interspersed between the barbs (and the neck) at step 450. As shown in FIG. 4A, the barbs and the grooves are annular. This can be illustrated by stage 320C of FIG. 4A. The number of barbs and grooves may vary depending on the pipe fitting needed. The width of the grooves and/or the barbs, the diameter of the pipe fitting, the difference in height between the barbs and the bottom of the grooves, etc., may also vary depending on the pipe fitting needed. For instance, when the pipe fitting is for a certain PEX pipe with a diameter of 0.875 inches, the diameter of the pipe fitting may be of around 0.75 inches. Similarly, for a pipe fitting adapted to a PEX pipe, there may be three interspersed grooves along the length of the pipe fitting 120.

The forming of step 450 may be performed by roll forming the end portion 310 of the copper pipe 130, where the excess material is pushed away towards the end of the copper pipe 130, forming the barbs at the desired portions as the material is being rolled away. However, it will be understood, that, in some examples, the forming of step 450 may be done by crimping the end portion, rotary forming the end portion, die pressing the end portion, etc.

As shown in FIG. 4A, some excess material may be present at the end of the raw pipe fitting at stage 320C, or the end portion of the copper pipe 130 may requiring further shaping to finalize the pipe fitting. As such, optionally, this excess portion may be machined-away and/or the entire geometry further refined by machining the pipe fitting (i.e. removed) at step 460, resulting in the pipe fitting 120 (illustrated, e.g., as stage 330). Optionally, the pipe fitting 120 may be buffed and/or polished.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A method of installing a drain water heat recovery exchanger for pre-heating water to be heated using a solar, electric or combustion energy hot water heater or to be sent to the cold-water line of a hot-water-consuming apparatus, the method comprising:
    providing a drain water heat recovery exchanger including:
        a copper pipe with an integral copper pipe fitting with a diameter that is smaller than a non-fitting portion of said copper pipe of said drain water heat recovery exchanger and an integral copper pipe outlet fitting with a diameter that is smaller than said non-fitting portion of said copper pipe of said drain water heat recovery exchanger, wherein each of said fittings is fashioned from said copper pipe of said drain water heat recovery exchanger by at least one of rotary-forming, roll-forming, crimping and die-pressing said copper pipe to include barbs for a male plastic pipe connection; and
        a core waste water drain tube;
    cutting out a portion of a vertical drain water pipe of a building;
    inserting said drain water heat recovery exchanger into said drain water pipe at a position of said cut-out portion of said drain water pipe;
    connecting said core waste water drain tube to said drain water pipe; and
    selecting additional copper pipes or cross-linked polyethylene pipes for connecting to said fittings, and
        when said cross-linked polyethylene pipes are selected, connecting a first one of said fittings to a cold-water supply using a first cross-linked polyethylene pipe of said cross-linked polyethylene pipes, and connecting a second one of said fittings to an inlet of a hot water heater, a hot water tank or a cold-water line of a hot-water-consuming apparatus using a second cross-linked polyethylene pipe of said cross-linked polyethylene pipes by making a bend in a length of said second cross-linked polyethylene pipe between said second one of said fittings and said inlet of said hot water heater, said hot water tank or said cold-water line of said hot-water-consuming apparatus; and
        when said additional copper pipes are selected, cutting said fittings to remove a portion of said copper pipe including said barbs, soldering a copper pipe fitting to each end of said copper pipe of said drain water heat recovery exchanger, and connecting a first additional copper pipe of said additional copper pipes and a second additional copper pipe of said additional copper pipes to respectively each of said copper pipe fittings, wherein said first additional copper pipe is connected or connectable to a cold-water supply and said second additional copper pipe is connected or connectable to an inlet of a hot water heater, a hot water tank or a cold-water line of a hot-water-consuming apparatus.

2. The method as defined in claim 1, wherein said fittings are connected using said first cross-linked polyethylene pipe and said second cross-linked polyethylene pipe, and said connecting comprises using a first clamp ring to secure said first cross-linked polyethylene pipe to said first one of said fittings, and using a second clamp ring to secure said second cross-linked polyethylene pipe to said second one of said fittings.

3. The method as defined in claim 1, wherein said fittings are connected using said first cross-linked polyethylene pipe and said second cross-linked polyethylene pipe, and said bend has a radius between 6 to 8 times a diameter of said second cross-linked polyethylene pipe.

4. The method as defined in claim 1, wherein said fittings are connected using said first cross-linked polyethylene pipe and said second cross-linked polyethylene pipe, and said connecting comprises making a bend in a length of said first cross-linked polyethylene pipe between said first one of said fittings and a fitting connected to said cold-water supply.

5. The method as defined in claim 4, wherein said bend in a length of said first cross-linked polyethylene pipe between said inlet fitting and a fitting connected to said cold-water supply has a radius between 6 to 8 times a diameter of said plastic pipe.

6. The method as defined in claim 1, wherein said copper pipe of said provided drain water heat recovery exchanger is spirally wrapped around said core waste water drain tube.

7. A method of installing a drain water heat recovery exchanger to a water supply system of a building for recovering heat from waste water for heating cold water coming from a cold-water line of said water supply system, comprising:
 providing a drain water heat recovery exchanger comprising:
  a core waste water drain tube;
  a first copper pipe portion comprising an integral inlet pipe fitting fashioned from said first copper pipe portion by at least one of rotary-forming, roll-forming, crimping and die-pressing said first copper pipe portion to include a series of grooves and barbs and a diameter than is smaller than the diameter of the rest of said first copper pipe portion; and
  a second copper pipe portion comprising an integral outlet pipe fitting fashioned from said second copper pipe portion by at least one of rotary-forming, roll-forming, crimping and die-pressing said second copper pipe portion to include a series of grooves and barbs and a diameter than is smaller than the diameter of the rest of said first copper pipe portion;
 inserting said drain water heat recovery exchanger into a drain water pipe, wherein said core tube is connected to said drain water pipe;
 connecting a pipe of a cold-water line to said inlet pipe fitting; and
 connecting a pipe of at least one of a hot-water tank and a cold-water line of a hot-water consuming-apparatus to said outlet pipe fitting.

8. The method as defined in claim 7, wherein said first copper pipe portion and said second copper pipe portion are part of a copper coil pipe of said provided drain water heat recovery exchanger that spirally wraps around said core tube.

9. The method as defined in claim 7, wherein said inlet pipe fitting of said provided drain water heat recovery exchanger comprises three interspaced grooves, and wherein said outlet pipe fitting of said provided drain water heat recovery exchanger comprises three interspaced grooves.

10. The method as defined in claim 7, further comprising removing a portion of said drain water pipe prior to connecting said tube to said drain water pipe.

11. The method as defined in claim 7, wherein said fastened pipe of said cold water line is composed of cross-linked polyethylene (PEX), and wherein said fastened pipe directing water to said at least one a hot-water tank and a cold-water line of a hot-water consuming apparatus is composed of cross-linked polyethylene (PEX).

12. The method as defined in claim 7, wherein at least one of said inlet pipe fitting of said provided drain water heat recovery exchanger and said outlet pipe fitting of said provided drain water heat recovery exchanger has a diameter between 3/8 of an inch and 1 inch.

* * * * *